United States Patent
Tai et al.

(10) Patent No.: US 12,532,109 B2
(45) Date of Patent: Jan. 20, 2026

(54) SYSTEM AND METHOD FOR CAPTURING SOUND SOURCE

(71) Applicant: AVER INFORMATION INC., New Taipei (TW)

(72) Inventors: Pang-Ti Tai, New Taipei (TW); Po-Hsun Wu, New Taipei (TW); Yun-Long Sie, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 256 days.

(21) Appl. No.: 18/368,799

(22) Filed: Sep. 15, 2023

(65) Prior Publication Data
US 2024/0098406 A1    Mar. 21, 2024

(30) Foreign Application Priority Data
Sep. 16, 2022   (TW) .................. 111135093

(51) Int. Cl.
*H04R 1/08*   (2006.01)
*G06V 10/25*  (2022.01)
*H04R 1/32*   (2006.01)

(52) U.S. Cl.
CPC ............. *H04R 1/326* (2013.01); *G06V 10/25* (2022.01); *H04R 1/08* (2013.01); *G06V 2201/07* (2022.01); *G06V 2201/09* (2022.01); *H04R 2201/40* (2013.01)

(58) Field of Classification Search
CPC ....... H04R 1/326; H04R 1/08; H04R 2201/40
See application file for complete search history.

(56) References Cited

U.S. PATENT DOCUMENTS

| | | | |
|---|---|---|---|
| 2015/0023524 | A1* | 1/2015 | Shigenaga ............... H04R 1/32 381/92 |
| 2016/0277863 | A1 | 9/2016 | Cahill et al. |
| 2017/0133036 | A1 | 5/2017 | Cohen et al. |
| 2020/0351435 | A1 | 11/2020 | Therkelsen et al. |

FOREIGN PATENT DOCUMENTS

| | | |
|---|---|---|
| EP | 1551171 A1 | 7/2005 |
| TW | 201643688 A | 12/2016 |
| TW | 202034104 A | 9/2020 |
| WO | 2004100546 A1 | 11/2004 |

OTHER PUBLICATIONS

EU Extended European Search Report dated Feb. 27, 2024 in application No. 23197569.9.

* cited by examiner

*Primary Examiner* — Suhan Ni
(74) *Attorney, Agent, or Firm* — Maschoff Brennan

(57) ABSTRACT

A method for capturing a sound source includes: capturing a space where a microphone array is located to generate an image by a camera, wherein the microphone array is configured to receive a sound generated by the sound source and generate a sound source coordinate of the sound source relative to the microphone array; searching for a sub-image belonging to the microphone array within the images by a computing device connected to the camera; calculating a microphone coordinate of the microphone array relative to the camera by the computing device according to the sub-image; calculating a required control parameter by the computing device at least according to the sound source coordinate and the microphone coordinate; adjusting a capturing direction by the camera to capture the sound source at least according to the required control parameter.

10 Claims, 13 Drawing Sheets

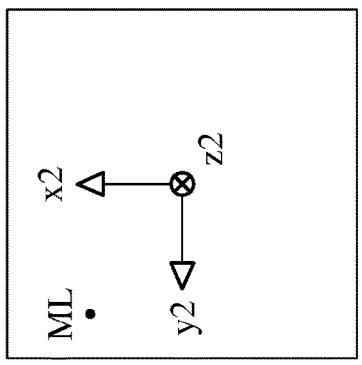
FIG. 12(a)
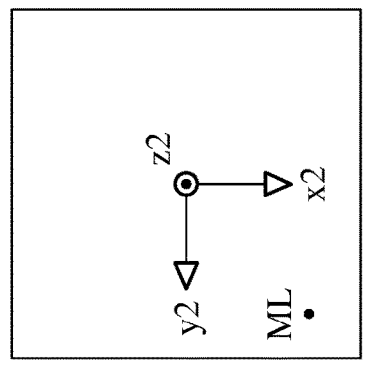
FIG. 12(b)
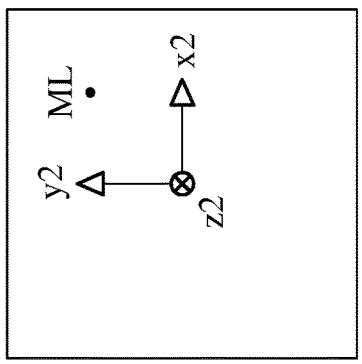
FIG. 12(c)
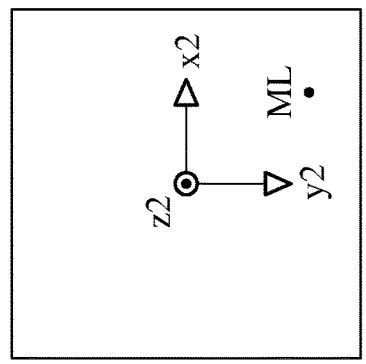
FIG. 12(d)
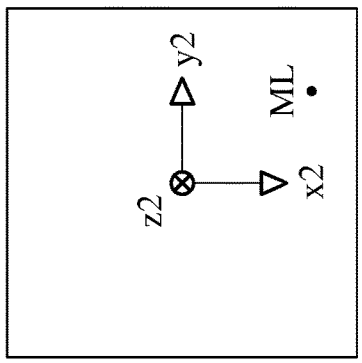
FIG. 12(e)
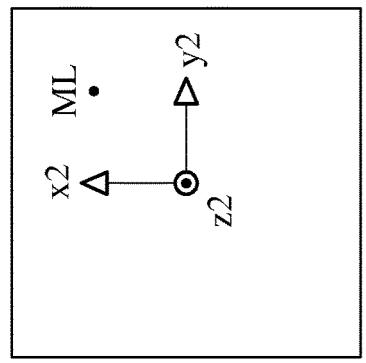
FIG. 12(f)
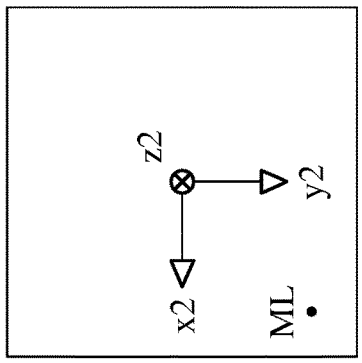
FIG. 12(g)
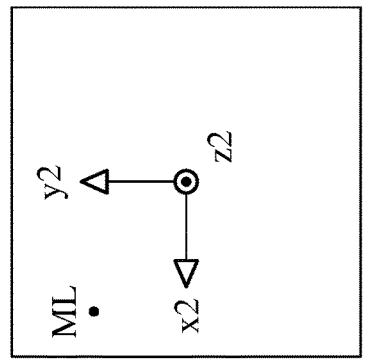
FIG. 12(h)
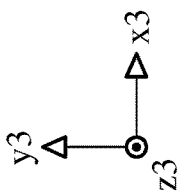

SYSTEM AND METHOD FOR CAPTURING SOUND SOURCE

CROSS-REFERENCE TO RELATED APPLICATIONS

This non-provisional application claims priority under 35 U.S.C. § 119(a) on Patent Application No(s). 111135093 filed in Taiwan on Sep. 16, 2022, the entire contents of which are hereby incorporated by reference.

BACKGROUND

1. Technical Field

The present disclosure relates to a pan-tilt-zoom camera (PTZ camera) and a sound source tracking photography, and more particular to a method for capturing a sound source.

2. Related Art

In application scenarios such as video conferencing, remote education, or telemedicine, all local participants and the video conferencing system are located in the same space. To allow remote users to easily identify the current speaker among multiple participants, the video conferencing system can use a PTZ camera to capture images of the current speaker by directing the camera toward the current speaker.

An existing tracking photography approach involves presetting the direction of each seat relative to the PTZ camera. When a sound coming from a particular location is detected, the PTZ camera's lens is then controlled to turn and capture that location. However, this approach requires manual preconfiguration, and as the number of seats increases, it consumes more time for setup.

Another approach is to use a sound source tracking camera that integrates a microphone array with a PTZ camera to track the speaker. However, this approach requires specialized hardware and is not suitable for regular PTZ cameras and microphone arrays, as it imposes higher hardware requirements.

SUMMARY

In light of the above descriptions, the present disclosure provides a system and method for capturing a sound source that enables a PTZ camera to accurately track the speaker's position according to the sound.

According to one or more embodiment of the present disclosure, a method for capturing a sound source includes: capturing a space where a microphone array is located to generate an image by a camera, wherein the microphone array is configured to receive a sound generated by the sound source and generate a sound source coordinate of the sound source relative to the microphone array; searching for a sub-image belonging to the microphone array within the image by a computing device connected to the camera; calculating a microphone coordinate of the microphone array relative to the camera by the computing device according to the sub-image; calculating a required control parameter by the computing device at least according to the sound source coordinate and the microphone coordinate; and adjusting a capturing direction by the camera to capture the sound source at least according to the required control parameter.

According to one or more embodiment of the present disclosure, a system for capturing a sound source includes a camera and a computing device. The camera captures a space where a microphone array is located to generate an image, wherein the microphone array is configured to receive a sound generated by the sound source and generate a sound source coordinate of the sound source relative to the microphone array. The computing device is electrically connected to the microphone array and the camera, wherein the computing device is configured to search for a sub-image belonging to the microphone array within the image, calculate a microphone coordinate of the microphone array relative to the camera according to the sub-image, calculate a required control parameter at least according to the sound source coordinate and the microphone coordinate, and control the camera to adjust a capturing direction to capture the sound source at least according to the required control parameter.

In view of the above, the system and method for capturing a sound source proposed by the present disclosure eliminate the need for expensive sound source tracking cameras and the requirement to install the camera and microphone array in the same location. This system can capture the speaker's current position in real-time, without being limited to a predefined set of fixed directions. The present disclosure is applicable to standalone PTZ cameras and microphone arrays, and it achieves real-time speaker tracking by automatically detecting the relative positioning between the camera and microphone, meeting the demand for dynamic tracking of speakers.

The aforementioned context of the present disclosure and the detailed description given herein below are used to demonstrate and explain the concept and the spirit of the present application and provides the further explanation of the claim of the present application.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 12(a) to FIG. 12(h) are schematic diagrams showing coordinate axis correspondences.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
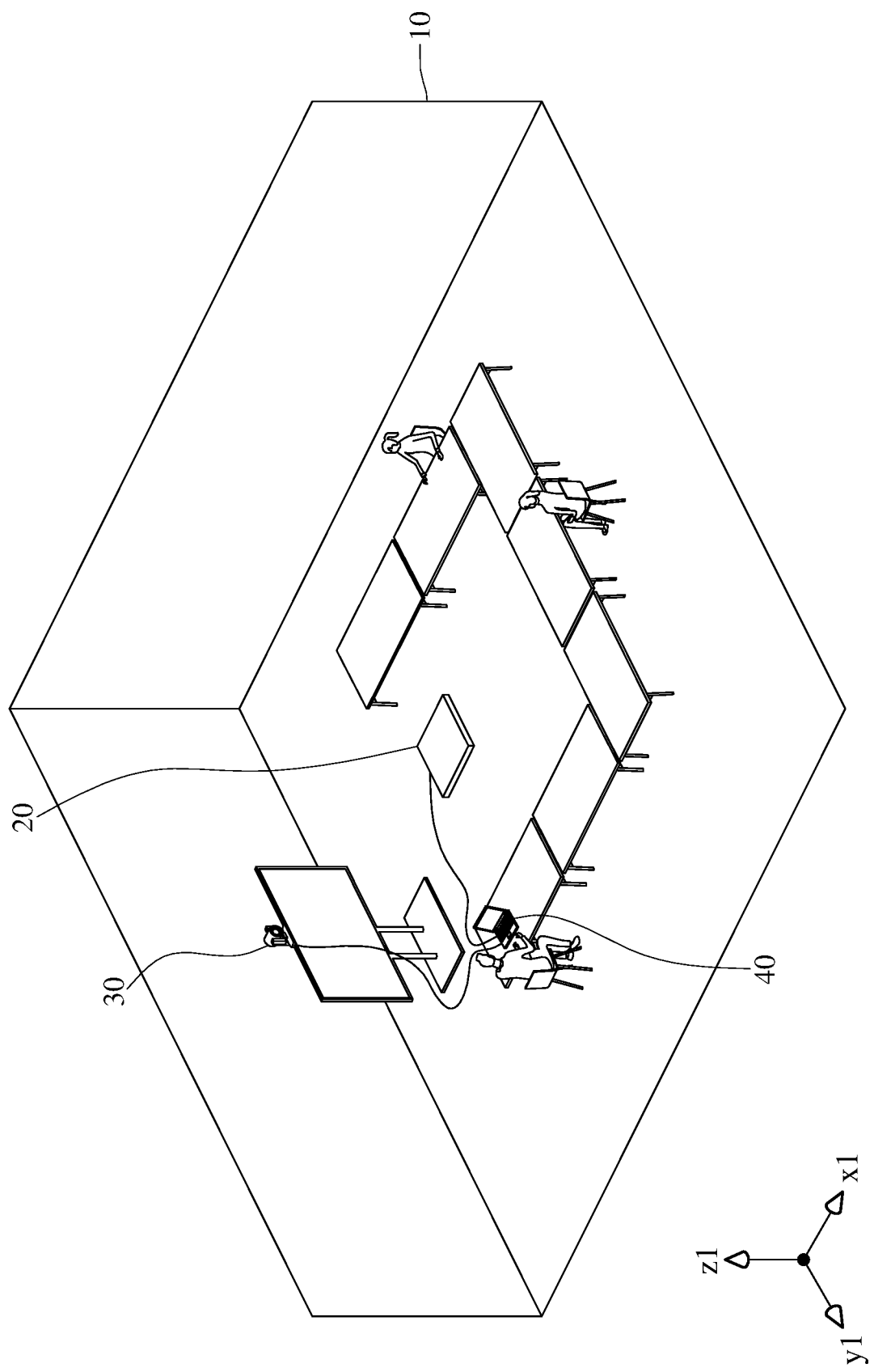
FIG. 1 is an application scenario diagram of a system for capturing a sound source according to an embodiment of the present disclosure.

FIG. 1 is an application scenario diagram of a system for capturing a sound source according to an embodiment of the present disclosure. A space 10 such as a conference room accommodates a plurality of participants. The system for capturing a sound source includes a camera 30 and a computing device 40, which can be used in conjunction with a microphone array 20. In another embodiment, the system for capturing a sound source additionally includes the microphone array 20.

The microphone array 20 includes at least two microphones and a built-in processor. The at least two microphones are capable of receiving sound generated by the sound source. The built-in processor is electrically connected to the at least two microphones and is capable of analyzing the location of the sound. For example, it calculates the time difference based on the sound received by each of the at least two microphones, subsequently calculating the sound source coordinates of the sound source relative to the microphone array 20. The sound source coordinate refers to the three-dimensional coordinates of the sound source's location, with a designated position on the microphone array 20 (such as the center point of the microphone array) serving as the origin.

The camera 30, for example, is a PTZ camera. The camera 30 can adjust its capturing direction, capture the space 10 to generate an image. The camera 30 and the microphone array 20 are two independently positioned devices. For example, the camera 30 is installed on a table, while the microphone array 20 is suspended from the ceiling.

The computing device 40 is communicably connected to the microphone array 20 and the camera 30 (by wired or wireless connections). In an embodiment, the computing device 40 is an external computer separate from the camera 30. In another embodiment, the computing device 40 is a microprocessor integrated within the camera 30. The computing device 40 itself may include storage devices such as hard drives or memory. The storage device records multiple reference information associated with the microphone array 20, which will be detailed later.

The computing device 40 is capable of retrieving images from the camera 30, obtaining the sound source coordinate from the microphone array 20, and accessing reference information from the storage device. The computing device 40 then executes multiple instructions based on the aforementioned data to implement the method for capturing a sound source according to an embodiment of the present disclosure.

Figure 2:
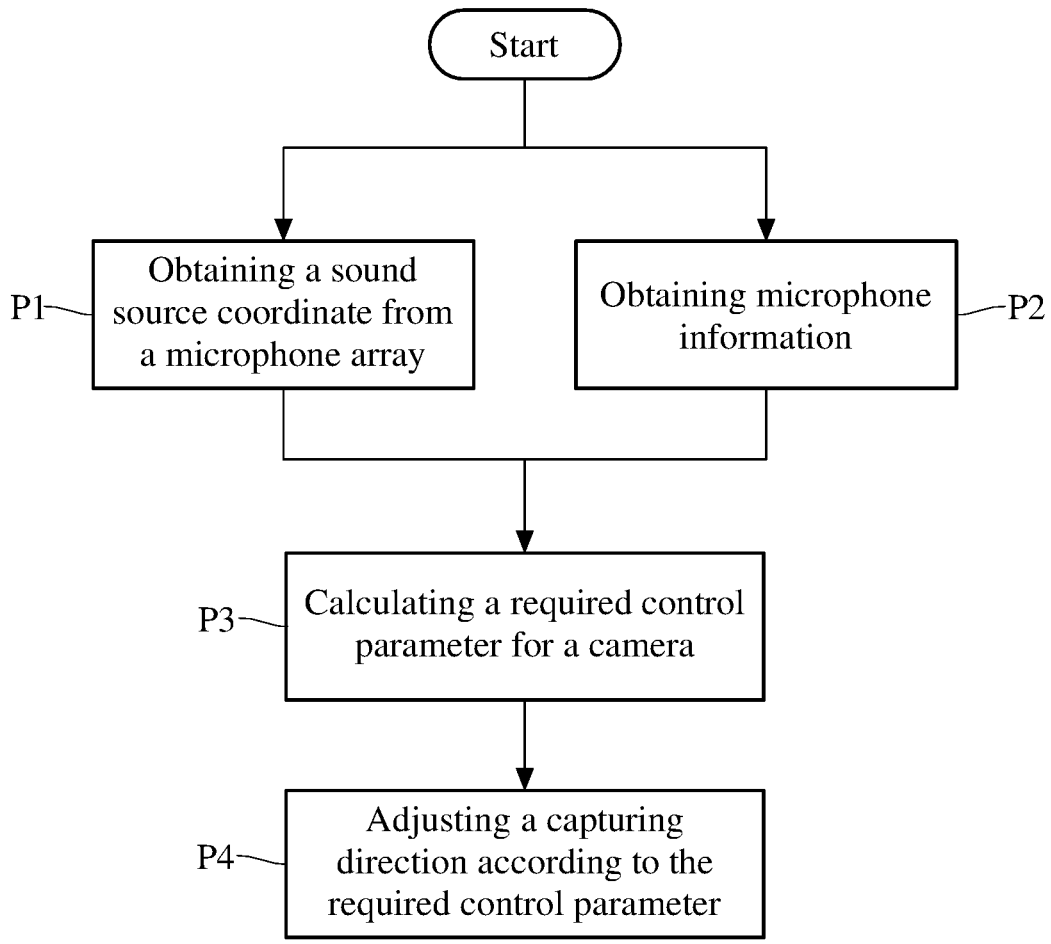
FIG. 2 is a flowchart of a method for capturing a sound source according to an embodiment of the present disclosure.

FIG. 2 is a flowchart of a method for capturing a sound source according to an embodiment of the present disclosure. In step P1, the computing device 40 obtains a sound source coordinate from the microphone array 20. In step P2, the computing device 40 obtains the microphone information. If the method of this embodiment has been executed before, the computing device 40 can obtain the microphone information from the storage device. The following describes the process for generating microphone information when the method is executed for the first time.

The microphone information includes a microphone coordinate, coordinate axis direction information and a compensation control parameter. The microphone coordinate refers to the three-dimensional coordinates of the microphone array 20's location, with the camera 30 as the origin. The compensation control parameter is configured to adjust the camera 30's capturing direction toward the microphone array 20, with details provided later.

Figure 3:
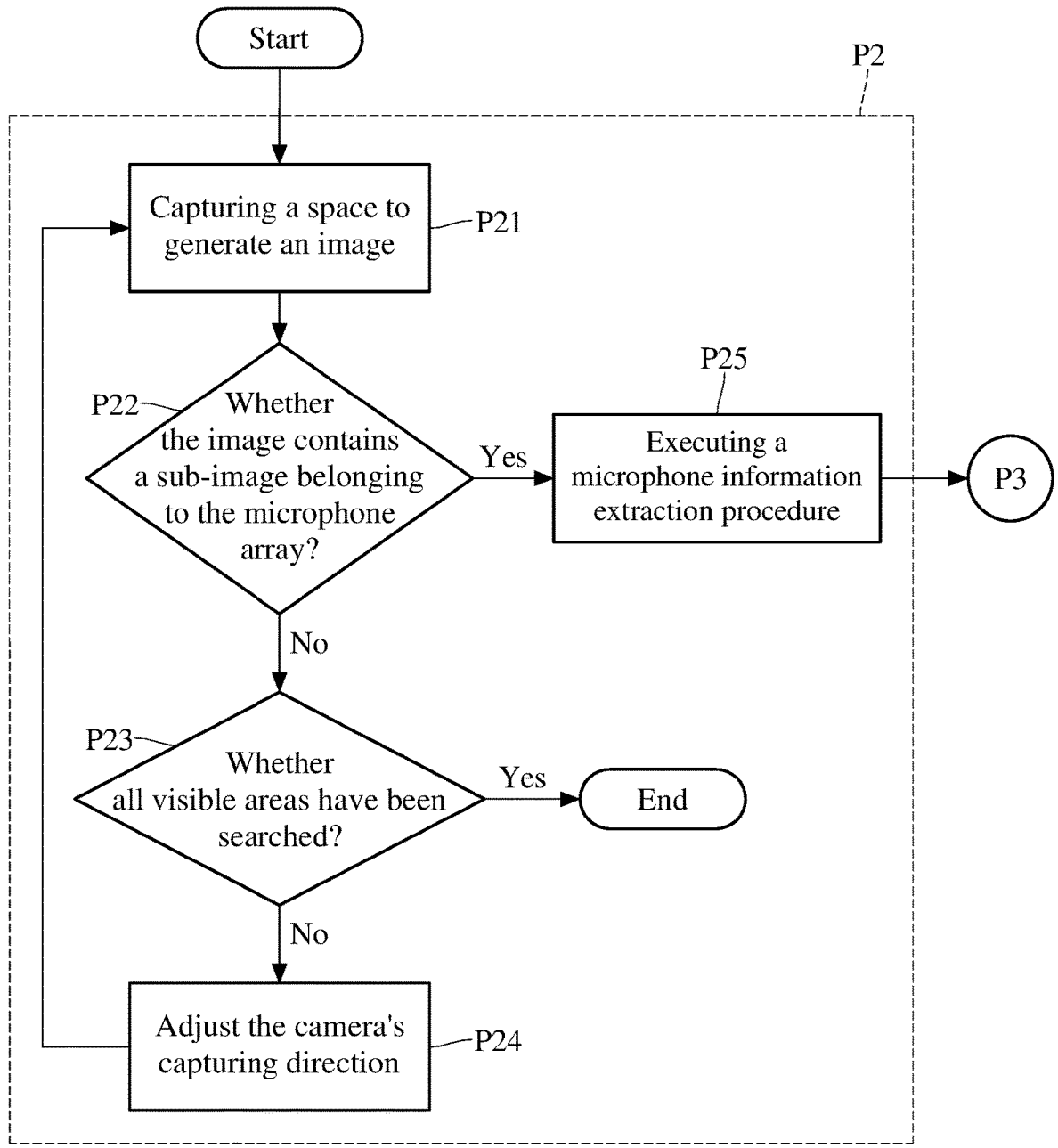
FIG. 3 is a detailed flowchart of a step in FIG. 2.

FIG. 3 provides a detailed flowchart for obtaining the microphone information. In step P21, the camera 30 captures the space 10 to generate an image. The camera 30's capturing operation and direction adjustment operations can be controlled by the computing device 40, manually controlled by the user, or automatically controlled by the camera 30 using its built-in timer. The present disclosure does not impose restrictions on this aspect.

In step P22, the computing device 40 analyzes whether the image contains a sub-image belonging to the microphone array 20. In an embodiment, the computing device 40 reads the storage device to obtain reference information associated with the microphone array and searches for this reference information in the image. The reference information includes the overall image or characteristic features of the microphone array 20. In another embodiment, the computing device 40 employs image processing techniques or AI-based object recognition techniques to identify the sub-image belonging to the microphone array in the image.

If the determination in step P22 is "no", then step P23 is executed. In step P23, the computing device 40 determines whether all visible areas have been searched. If the determination is "yes", the method for capturing a sound source in this embodiment ends. Otherwise, step P24 is executed to adjust the camera 30's capturing direction, and return to step P21 to capture an image again.

The visible area refers to all the regions that can be captured under any rotation of the camera 30's lens. To illustrate with actual values, suppose the lens has a horizontal rotation range of 180 degrees, a vertical rotation range of 90 degrees, and each rotation is done in 10-degree increments. Then, the visible area includes positions that the lens can rotate to, which is $(180/10+1)*(90/10+1)=19*10=190$ different positions. Therefore, the determination in step P24 is essentially determining whether images have been captured from all 190 distinct positions.

If the determination in step P22 is "yes", then step P25 is executed, where the computing device 40 executes a microphone information extraction procedure according to the sub-image.

Figure 4:
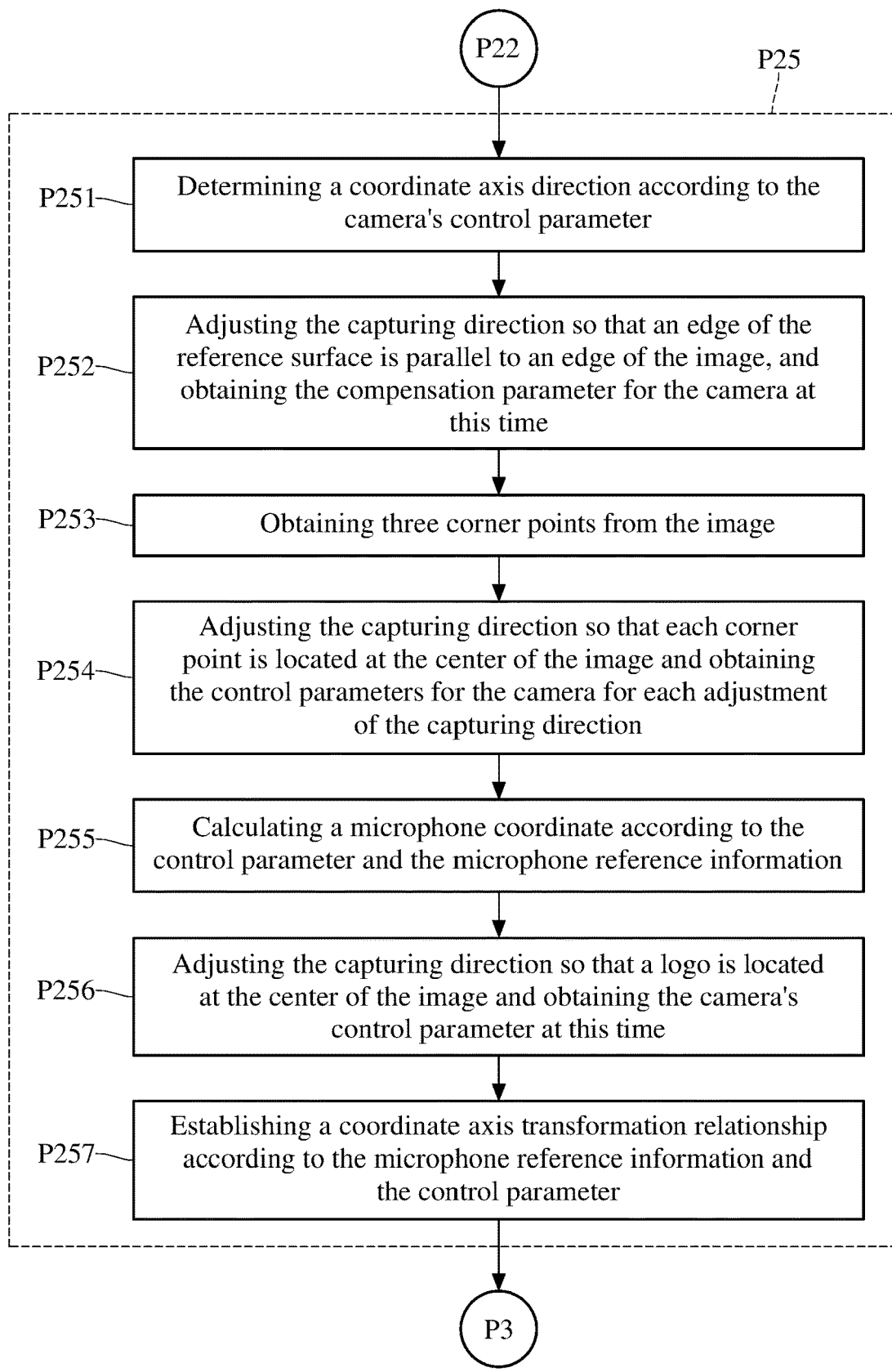
FIG. 4 is a detailed flowchart of a step in FIG. 3.
Figure 5:
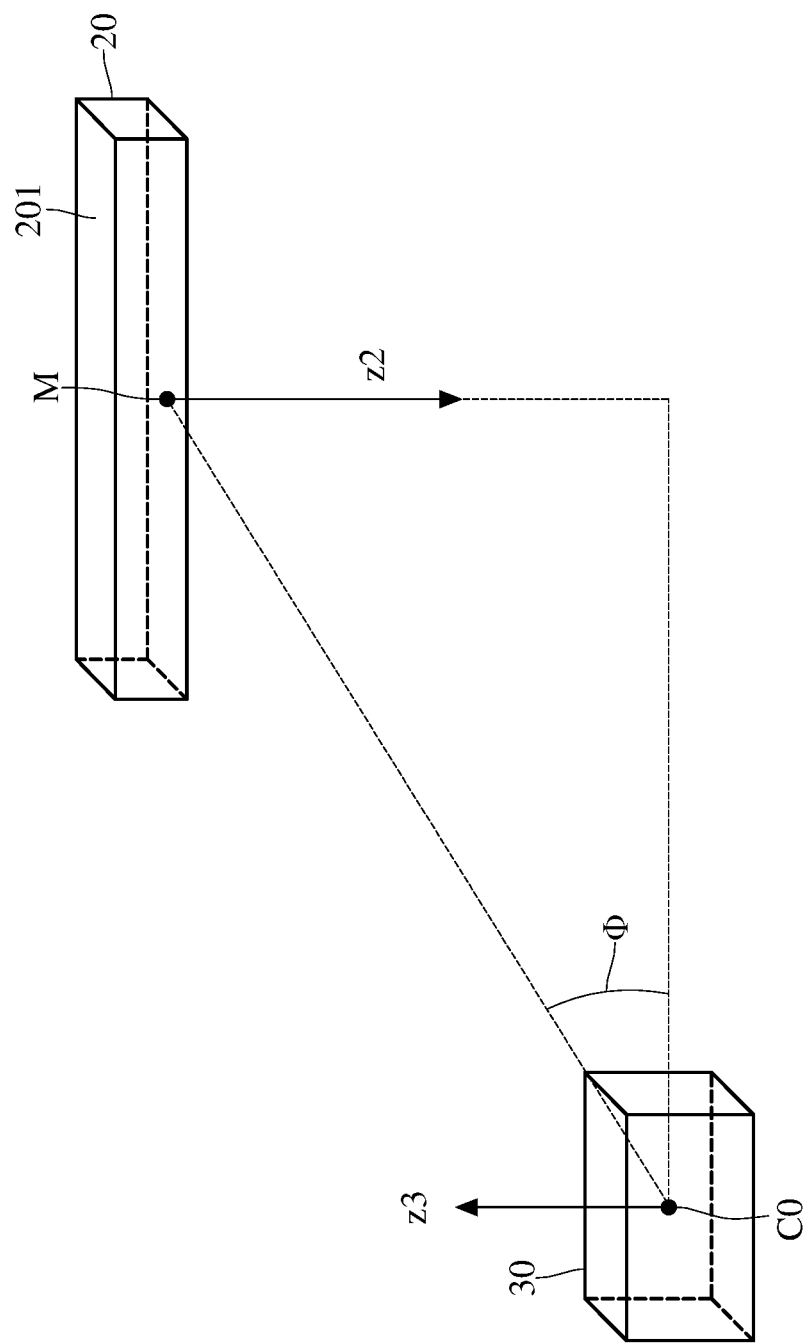
FIG. 5 and FIG. 6 are schematic diagrams showing the relative positions of the camera and microphone array.
Figure 6:
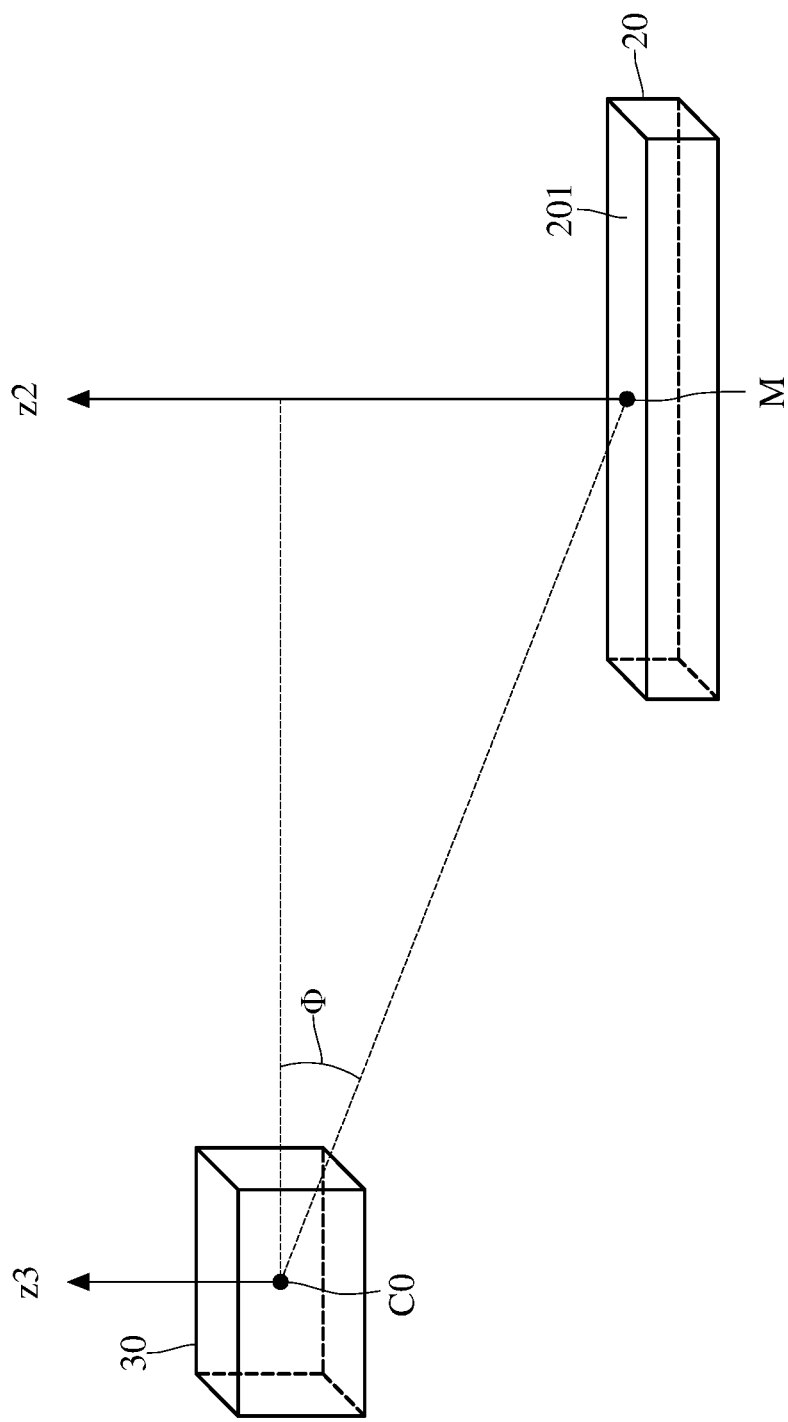

FIG. 4 provides a detailed flowchart of the microphone information extraction procedure. In step P251, since the camera 30 has captured the microphone array 20, the computing device 40 determines a coordinate axis direction according to the camera 30's control parameter at this moment. Specifically, it confirms whether the camera 30's Z-axis direction matches the microphone array 20's Z-axis direction according to the tilt angle of the PTZ camera lens. For example, if the camera 30 considers the direction above the lens as the positive z-axis, and the microphone array 20 considers the reference surface used for audio capturing as the positive z-axis, as shown in FIG. 5, when the camera 30 captures the reference surface 201 of the microphone array 20, if the tilt angle Φ is greater than a certain threshold (e.g., 45 degrees), it indicates that the microphone array 20's Z-axis direction z2 is opposite to the camera 30's Z-axis direction z3. In practical scenarios, this could occur if the camera 30 is placed on a table while the microphone array 20 is suspended from the ceiling. The direction z2 also corresponds to the receiving direction of the microphone array 20. In contrast, if the camera 30's tilt angle Φ is less than or equal to the threshold, as shown in the overhead operation in FIG. 6, it indicates that the microphone array 20's Z-axis direction z2 is the same as the camera 30's Z-axis direction z3.

Figure 7:
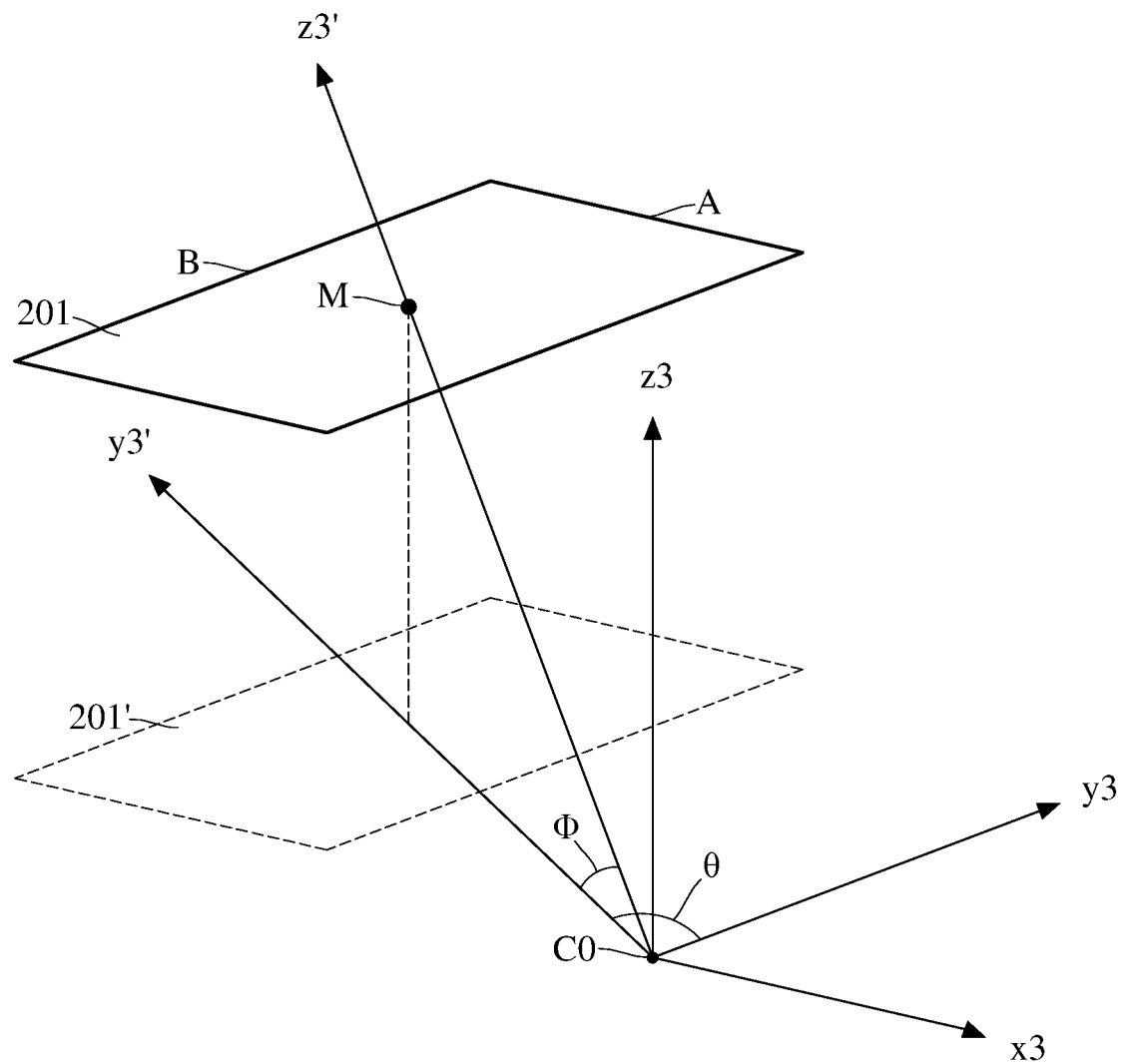
FIG. 7 to FIG. 11 are schematic diagrams of steps in FIG. 4.

In step P252, the camera 30 adjusts the capturing direction so that the edge of the reference surface 201 is parallel to the edge of the image. In an embodiment, both the image and the reference surface 201 have a rectangular shape. FIG. 7 is a schematic diagram of step P252, where (x3, y3, z3) represents the camera 30's coordinate system with origin C0. The camera 30's initial capturing direction is along y3. When step P252 is executed, the camera 30's capturing direction rotates horizontally by an angle θ to align with the y3' direction and then vertically by an angle Φ to align with the z3' direction. When the capturing direction is aligned with a point M near the center of the reference surface 201, the camera 30 can capture the entire reference surface 201 and meet the requirement of having the reference surface 201 parallel to the edge of the image. For example, this alignment could result in edge B appearing horizontally in the image or edge A appearing vertically in the image. At this point, the computing device 40 obtains a compensation control parameter for the camera 30, including the pan angle θ and tilt angle Φ, which will be used for compensation operations in subsequent steps.

Figure 8:
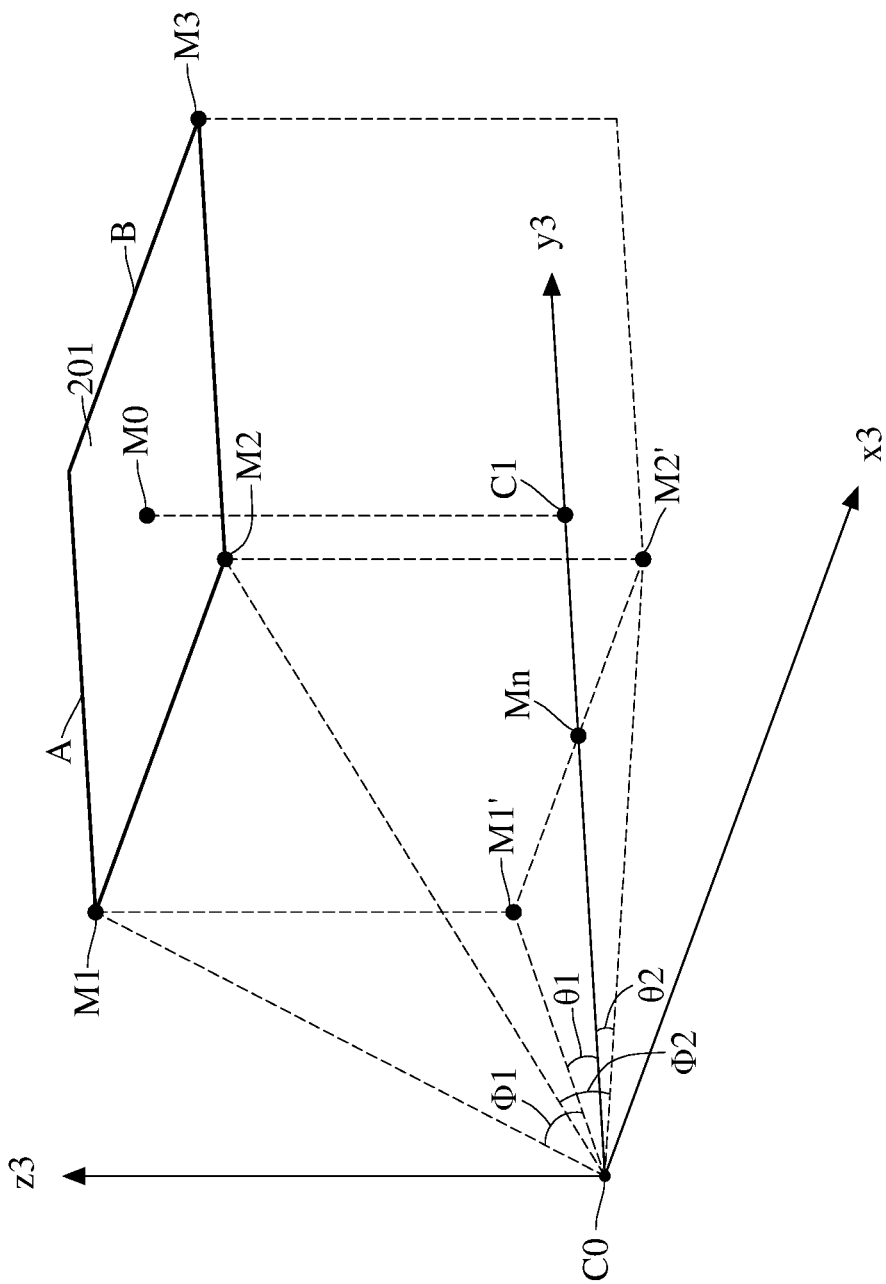

In step P253, the computing device 40 obtains at least three corner points from the image. In step P254, the camera 30 adjusts the capturing direction so that each corner point is located at the center of the image and the control parameters of the camera 30 for each adjustment of the capturing direction is obtained. FIG. 8 is a schematic diagram of an embodiment of steps P253 and P254. The image used in step P253 is an image where the reference surface 201 of the microphone array 20 is fully captured. For example, as shown in FIG. 8, the shape of the reference surface 201 is a rectangle. For the sake of illustration, let's explain using three corner points—the first corner point M1, the second corner point M2, and the third corner point M3 as examples. M0 represents the center of the reference surface 201, and the present disclosure refers to M0's coordinates as the microphone coordinate.

In an embodiment, the computing device 40 can utilize any edge detection algorithm to identify three non-collinear corner points, namely M1 to M3, located at the edges of the reference surface 201 in the image. In another embodiment, the user manually sets these three non-collinear corner points M1 to M3. The present disclosure does not limit the position and maximum number of corner points.

Before step P254 is executed, the camera 30 captures along the y3 direction, the center of the captured image is at C1 in FIG. 8. During the execution of step P254, to position the first corner point M1 in the center of the image, the camera 30 rotates from the initial capturing direction y3 to the left (in the opposite direction of the x3 arrow) by an angle θ1 and then upward (in the z3 arrow direction) by an angle Φ1. To position the second corner point M2 in the center of the image, the camera 30 rotates from the initial capturing direction y3 to the right (in the x3 arrow direction) by an angle θ2 and then upward (in the z3 arrow direction) by an angle Ι2. The procedure for positioning the third corner point M3 in the center of the image follows a similar process with rotation angles θ3 and Φ3, respectively.

Figure 9:
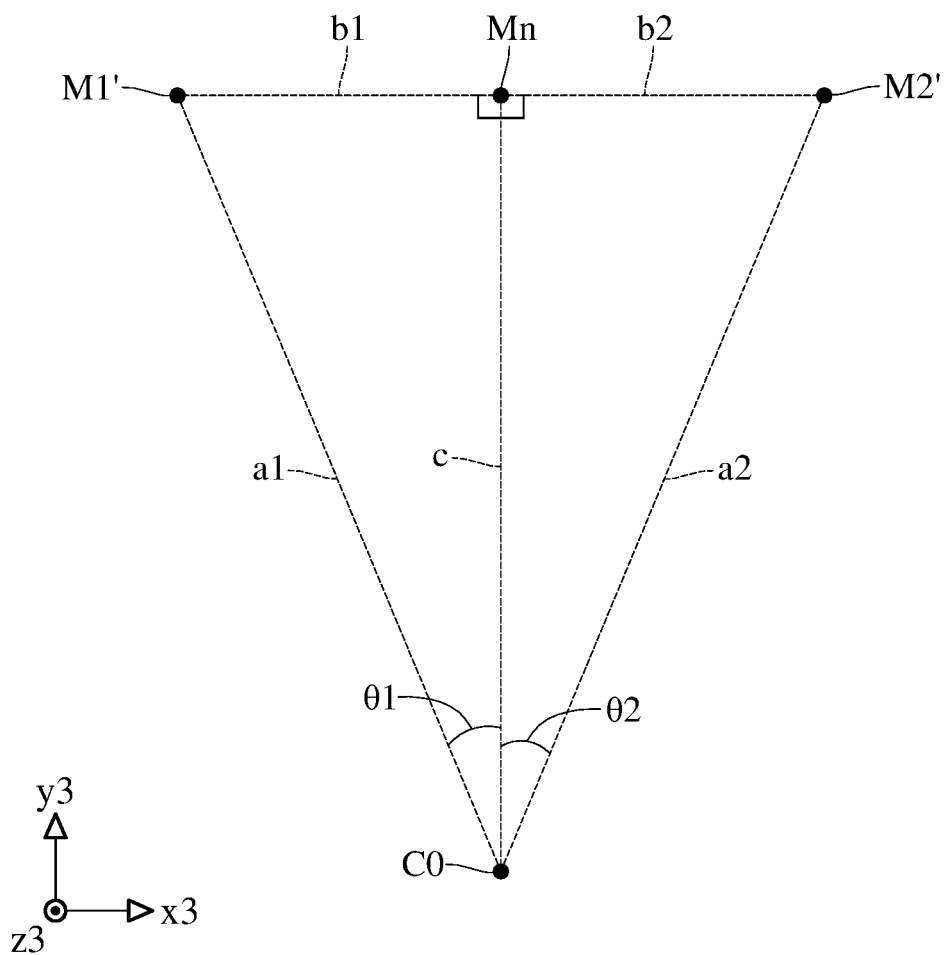
Figure 10:
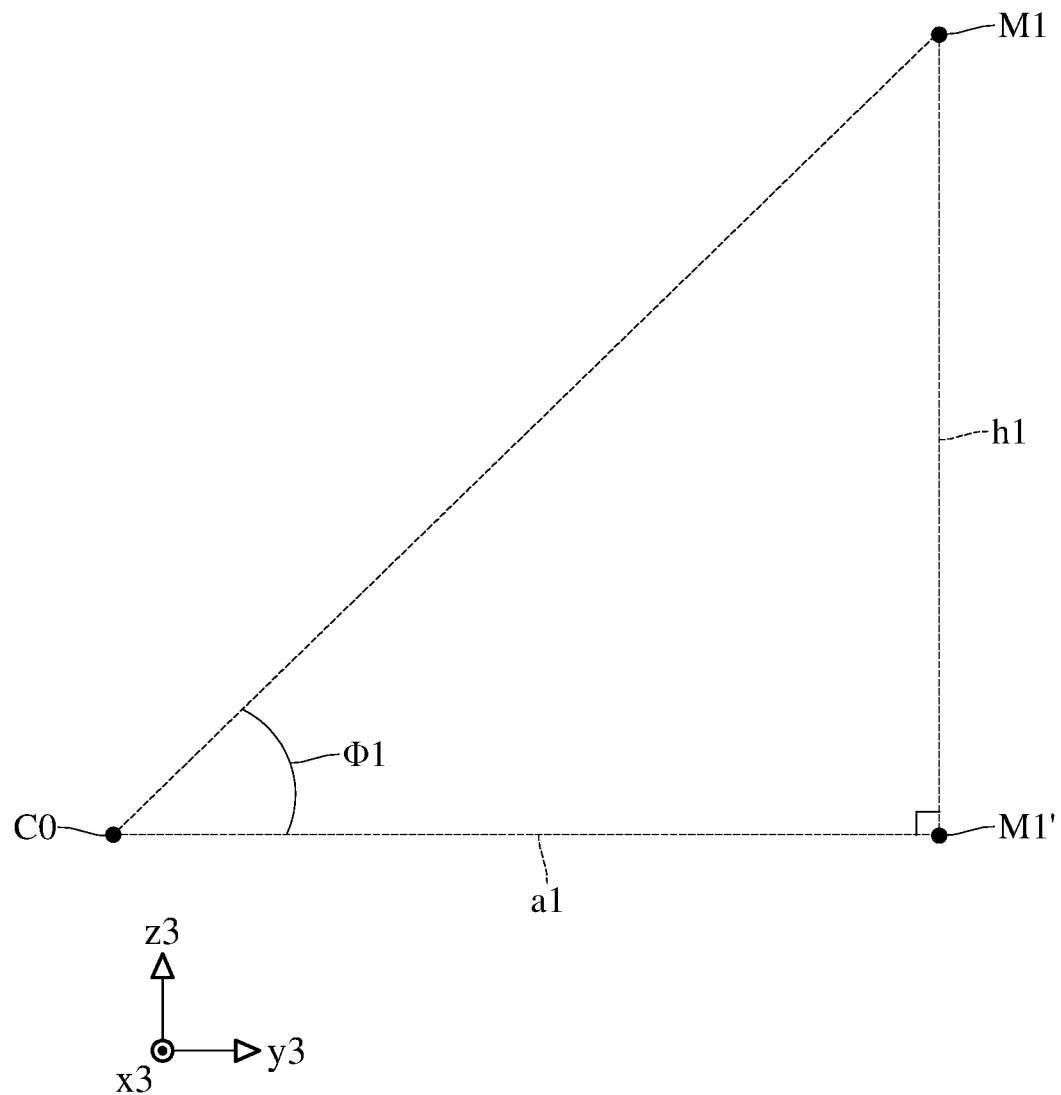

In step P254, the control parameters collected by the computing device 40 include angles θ1, θ2, θ3, and angles Φ1, Φ2, Φ3. In step P255, the computing device 40 calculates a microphone coordinate according to the control parameters and the microphone reference information. FIG. 9 and FIG. 10 are schematic diagrams according to an embodiment of step P254. The first corner point M1 and the second corner point M2, when projected onto the (x3, y3) plane, are denoted as M1' and M2', respectively. Additionally, the computing device reads the microphone length information from the storage device, which includes the side lengths A and B of the reference surface 201.

In the example of FIG. 9, suppose the compensation control parameters obtained in step P252 are used to adjust the horizontal capturing direction of the camera 30 as the initial capturing direction (y3 arrow direction), and the projected point M1' of the first corner point M1 and the projected point M2' of the second corner point M2 are on opposite sides of the capturing direction of the camera 30. The length of the line connecting M1' and M2' is the microphone side length B. The midpoint of the line connecting M1' and M2' is denoted as Mn, and the length of the line connecting M1' to Mn is denoted as b1, while the length of the line connecting M2' to Mn is denoted as b2. The line connecting Mn to C0 is perpendicular to the line connecting M1' and M2', and the length of the line connecting Mn to C0 is denoted as c. Based on the trigonometric functions tan(θ1)=b1/c and tan(θ2)=b2/c, tan(θ1)+tan(θ2)=(b1+b2)/c=B/c can be derived. Therefore, the Y-coordinate of the first corner point M1 is c, and c=B/(tan(θ1)+tan(θ2)). The Y-coordinate of the second corner point M2 is equal to the Y-coordinate of the first corner point M1. The X-coordinate of the first corner point M1 is −b1, where b1=c*tan(θ1). The X-coordinate of the second corner point M2 is b2, and b2=c*tan(θ2). The X and Y coordinates of the third corner point M3 can be calculated using similar methods as described above.

Continuing with the example of FIG. 9, the length a1 from C0 to M1' can be calculated using the Pythagorean theorem. In FIG. 10, the Z-coordinate of the first corner point M1 is h1. According to the trigonometric function tan(Φ1)=h1/a1, h1=a1*tan(Φ1) can be calculated. Because the reference plane 201 is parallel to the x3-y3 plane, the Z-coordinates of the second corner point M2 and the third corner point M3 are both equal to the Z-coordinate of the first corner point M1.

After calculating the three-dimensional coordinates of the three corner points M1-M3, the microphone coordinate can be calculated, which is the coordinate of the center M0 of the reference plane 201. M0's X-coordinate is the average of the X-coordinates of the first corner point M1 and the second corner point M2. M0's Y-coordinate is the average of the Y-coordinates of the third corner point M3 and the second corner point M2. M0's Z-coordinate is equal to the Z-coordinate of the first corner point M1.

Figure 11:
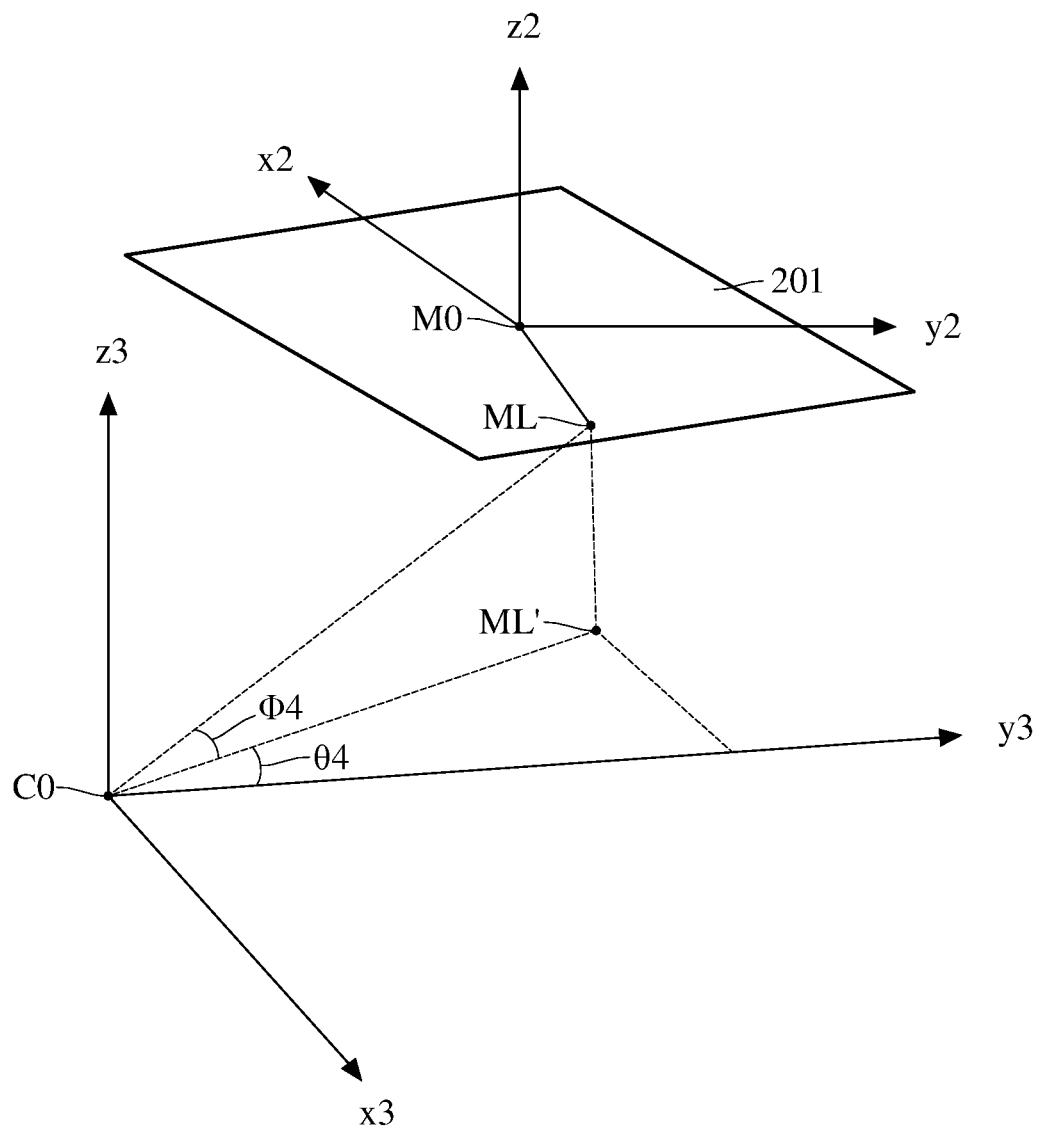

In step P256, the camera 30 adjusts the capturing direction so that the logo is located at the center of the image, and the computing device 40 obtains the camera's control parameter at this time. The logo is a specific pattern on the reference plane 201 of the microphone array 20. Different models of microphone arrays have different logos. These logos are pre-recorded in the storage device. FIG. 11 is a schematic diagram according to an embodiment of step P256. (x2, y2, z2) is the coordinate system of the microphone array 20, with its origin at M0 on the reference plane 201. To place the logo ML at the center of the image, the camera 30 rotates from its initial capturing direction y3 to the left (opposite direction of the x3 arrow) by an angle θ4 and then upward (in the z3 direction) by an angle Φ4.

In step P257, the computing device 40 reads the microphone reference information recorded in the storage device, which is the coordinate of the logo ML in the coordinate system (x2, y2, z2) of the microphone array 20. Based on the compensation control parameter θ obtained in step P252, the coordinate axes x2 and y2 of the microphone array 20 can overlap with the coordinate axes x3 and y3 of the camera 30 (excluding the origin, considering only the relationship between the coordinate axes). The microphone coordinate calculated in step P255 can be used to calculate the rotation angles θ5 and Φ5 that camera 30 needs to adjust in order to position the center point M0 of the microphone array 20 at the center of the image. By comparing the angles θ5 and Φ5 with the control parameters θ4 and Φ4 obtained in step P256, the relative positional relationship between the center point M0 of the microphone array 20 and the logo ML can be determined. Furthermore, according to the microphone reference information, which coordinate axes (x2, y2) of the microphone array 20 correspond to which coordinate axes of the camera 30 and whether the directions of the overlapping coordinate axes are the same or opposite can be deduced.

FIG. 12(*a*) to FIG. 12(*h*) show the correspondence of coordinate axes. FIG. 12(*a*) to FIG. 12(*d*) represent the case where z3 and z2 are in opposite directions, while FIG. 12(*e*) to FIG. 12(*h*) represent the case where z3 and z2 are in the same direction. The transformation of coordinate axes in FIG. 12(*a*) to FIG. 12(*h*) is shown in Table 1 below. Therefore, the computing device 40 can establish the coordinate axis transformation relationship between the microphone array 20 and the camera 30. The completion of step P257 indicates that the microphone information extraction procedure is finished, and step P3 is executed next.

TABLE 1 a list of coordinate axis correspondence relationships.

| FIG. 12(a) | FIG. 12(b) | FIG. 12(c) | FIG. 12(d) |
|---|---|---|---|
| x2→-x3<br>y2→-y3 | x2→-y3<br>y2→x3 | x2→x3<br>y2→y3 | x2→y3<br>y2→-x3 |

| FIG. 12(e) | FIG. 12(f) | FIG. 12(g) | FIG. 12(h) |
|---|---|---|---|
| x2→-x3<br>y2→y3 | x2→y3<br>y2→x3 | x2→x3<br>y2→-y3 | x2→-y3<br>y2→-x3 |

In step P3, the computing device 40 calculates a required control parameter for the camera 30 according to the sound source coordinate and the microphone information. More specifically, using the coordinate axis transformation relationship established in step P257, the computing device 40 can convert the sound source coordinate from the coordinate system (x2, y2, z2) of the microphone array 20 to the coordinate system (x3, y3, z3) of the camera 30. The computing device 40 adds the transformation result of the sound source coordinate to the microphone coordinates (the three-dimensional coordinates of the microphone array 20's location, with the camera 30 as the origin) to obtain the coordinate of the sound source with respect to the camera 30 as the origin, hereinafter referred to as the target coordinate.

Figure 14:
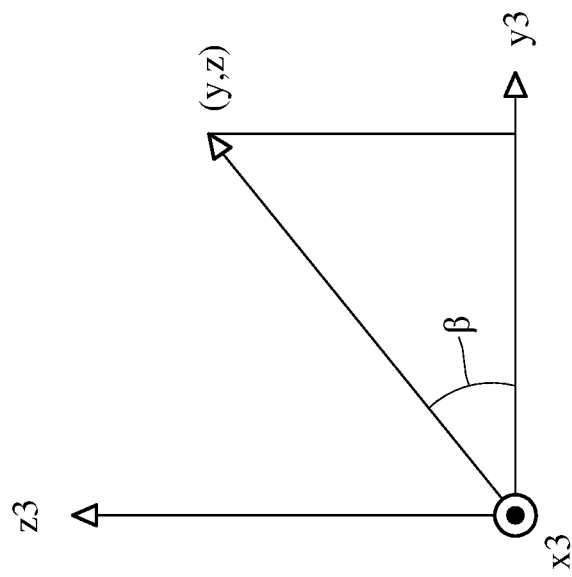
FIG. 13 and FIG. 14 are schematic diagrams illustrating the calculation of required control parameters according to the target coordinate.
Figure 13:
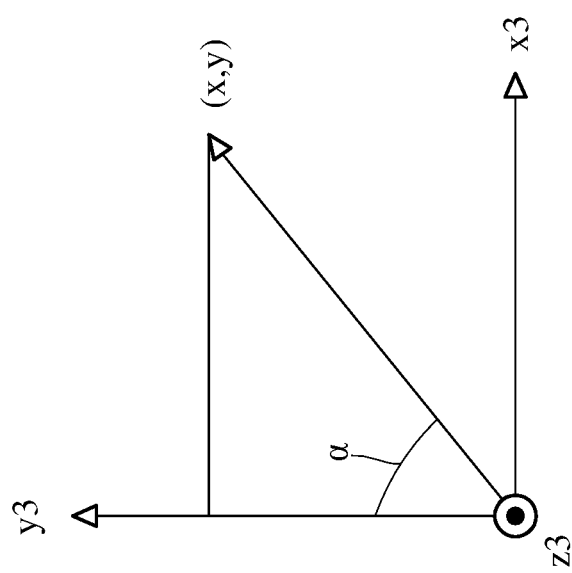

FIG. 13 and FIG. 14 are schematic diagrams illustrating the calculation of the required control parameter according to the target coordinate. As shown in FIG. 13, the computing device 40 inputs the X and Y coordinates of the target coordinate into the arctangent function, denoted as α=a tan (x/y), and adds the compensation control parameter θ recorded in step P252, resulting in α+θ, to obtain the required pan angle for capturing the sound source by the camera 30. As shown in FIG. 14, the computing device 40 inputs the Y and Z coordinates of the target coordinate into the arctangent function, denoted as β=a tan (z/y), to obtain the required tilt angle for capturing the sound source by the camera 30.

In step P4, the camera 30 adjusts the capturing direction according to the required control parameters, including the pan angle α+θ and the tilt angle β, to capture the sound source emitting the sound.

In some embodiments, the present disclosure can be used to compensate for the camera lens rotation direction in image tracking. For example, with the system and method for capturing a sound source proposed by the present disclosure, after tracking the current location of the speaker, the PTZ camera's lens can be directed toward that location, and the direction of the speaker in the image captured by the camera can be detected to compensate for the camera lens rotation direction. For example, by using face recognition, body detection, or other features to determine the direction of the speaker in the image (e.g., speaking towards the right side of the image), adjustments can be made to the camera's lens direction (e.g., slight adjustment to the right) to enhance the visual composition of the captured image. Another example is that with the system and method for capturing a sound source proposed by the present disclosure, after tracking the current location of the speaker, the PTZ camera's lens can be directed toward that location, and the position or proportion of the speaker's portrait in the image captured by the camera can be detected to compensate for the camera lens rotation direction. For example, if the system detects the position of the speaker's face, body, or other features in the image (e.g., slightly below the center of the image), it can correspondingly adjust the camera's lens direction (e.g., slight downward adjustment) to achieve a better tracking effect.

In view of the above, the system and method for capturing a sound source proposed by the present disclosure do not require pre-setting the camera lens direction, and the tracking range is not limited to fixed directions. The present disclosure can track the speaker's current position, is applicable to independent PTZ cameras and microphone arrays, and can achieve real-time tracking of the speaker's position by automatically detecting the relative positioning between the camera and the microphone.

Although embodiments of the present application are disclosed as described above, they are not intended to limit the present application, and a person having ordinary skill in the art, without departing from the spirit and scope of the present application, can make some changes in the shape, structure, feature and spirit described in the scope of the present application. Therefore, the scope of the present application shall be determined by the scope of the claims.

What is claimed is:

1. A method for capturing a sound source comprising:
  capturing a space where a microphone array is located to generate an image by a camera, wherein the microphone array is configured to receive a sound generated by the sound source and generate a sound source coordinate of the sound source relative to the microphone array;
  searching for a sub-image belonging to the microphone array within the image by a computing device connected to the camera;
  calculating a microphone coordinate of the microphone array relative to the camera by the computing device according to the sub-image;
  calculating a required control parameter by the computing device at least according to the sound source coordinate and the microphone coordinate; and
  adjusting a capturing direction by the camera to capture the sound source at least according to the required control parameter;
  wherein calculating the microphone coordinate of the microphone array relative to the camera by the computing device according to the sub-image comprises:

obtaining at least three non-collinear corner points along an edge of the sub-image by the computing device;

adjusting the capturing direction at least three times by the camera, when each of the at least three corner points locates at a specified position of the image, obtaining a control parameter of the camera by the computing device;

obtaining length information of the microphone array by the computing device; and calculating the microphone coordinate by the computing device according to the length information and the control parameter.

2. The method of claim 1, further comprising: adjusting the capturing direction by the camera according to the sub-image.

3. The method of claim 1, wherein the microphone array has a logo, the sub-image includes the logo, and the method further comprises:

calculating a logo coordinate of the logo relative to the camera by the computing device according to the sub-image; and wherein calculating the required control parameter by the computing device at least according to the sound source coordinate and the microphone coordinate comprises:

calculating the required control parameter by the computing device according to the logo coordinate, the sound source coordinate and the microphone coordinate.

4. The method of claim 3, further comprising:

adjusting the capturing direction by the camera, when an edge of the sub-image is parallel to an edge of the image, obtaining a compensation control parameter of the camera by the computing device;

obtaining microphone reference information associated with the logo by the computing device;

searching for an image block belonging to the logo within the sub-image by the computing device;

adjusting the capturing direction by the camera, when the image block is located at a specified position in the image, obtaining the control parameter of the camera by the computing device; and establishing a transformation relationship between a coordinate system of the microphone array and a coordinate system of the camera by the computing device according to the compensation control parameter and the control parameter.

5. The method of claim 4, wherein calculating the required control parameter by the computing device at least according to the sound source coordinate and the microphone coordinate comprises:

transforming the sound source coordinate according to the transformation relationship by the computing device to generate a transformed sound source coordinate;

adding up the transformed sound source coordinate and the microphone coordinate to generate a target coordinate of the sound source relative to the camera by the computing device, wherein the target coordinate has a first dimension, a second dimension, and a third dimension;

calculating a horizontal rotation angle of the required control parameter according to the first dimension, the second dimension, and an arctangent function by the computing device; and calculating a vertical rotation angle of the required control parameter according to the second dimension, the third dimension, and the arctangent function by the computing device.

6. A system for capturing a sound source comprising:

a camera capturing a space where a microphone array is located to generate an image, wherein the microphone array is configured to receive a sound generated by the sound source and generate a sound source coordinate of the sound source relative to the microphone array; and a computing device electrically connected to the microphone array and the camera, wherein the computing device is configured to search for a sub-image belonging to the microphone array within the image, calculate a microphone coordinate of the microphone array relative to the camera according to the sub-image, calculate a required control parameter at least according to the sound source coordinate and the microphone coordinate, and control the camera to adjust a capturing direction to capture the sound source at least according to the required control parameter;

wherein the computing device is configured to perform a plurality of instructions for calculating the microphone coordinate of the microphone array relative to the camera according to the sub-image, and the plurality of instructions comprises:

obtaining at least three non-collinear corner points along an edge of the sub-image;

adjusting the capturing direction at least three times by the camera, when each of the at least three corner points locates at a specified position of the image, obtaining a control parameter of the camera;

obtaining length information of the microphone array; and calculating the microphone coordinate according to the length information and the control parameter.

7. The system of claim 6, wherein the computing device is further configured to control the camera to adjust the capturing direction according to the sub-image.

8. The system of claim 6, wherein the microphone array has a logo, the sub-image includes the logo, and the computing device is further configured to calculate a logo coordinate of the logo relative to the camera according to the sub-image; and wherein calculating the required control parameter by the computing device at least according to the sound source coordinate and the microphone coordinate comprises:

calculating the required control parameter by the computing device according to the logo coordinate, the sound source coordinate and the microphone coordinate.

9. The system of claim 8, wherein the computing device is further configured to control the camera to adjust the capturing direction and obtain a compensation control parameter of the camera when an edge of the sub-image is parallel to an edge of the image, obtain microphone reference information associated with the logo, search for an image block belonging to the logo within the sub-image, control the camera to adjust the capturing direction and obtain the control parameter of the camera when the image block is located at a specified position in the image, and establish a transformation relationship between a coordinate system of the microphone array and a coordinate system of the camera according to the compensation control parameter and the control parameter.

10. The system of claim 9, wherein the computing device is configured to perform a plurality of instructions for calculating the required control parameter at least according to the sound source coordinate and the microphone coordinate, and the plurality of instructions comprises:

transforming the sound source coordinate according to the transformation relationship to generate a transformed sound source coordinate;

adding up the transformed sound source coordinate and the microphone coordinate to generate a target coordinate of the sound source relative to the camera, wherein the target coordinate has a first dimension, a second dimension, and a third dimension;

calculating a horizontal rotation angle of the required control parameter according to the first dimension, the second dimension, and an arctangent function; and calculating a vertical rotation angle of the required control parameter according to the second dimension, the third dimension, and the arctangent function.

\* \* \* \* \*